May 6, 1924.

G. PEREGO

VEHICLE TOP DUSTER

Filed July 11, 1922

1,492,894

INVENTOR
Grace Perego
BY
Carlos P. Griffin
ATTORNEY.

Patented May 6, 1924.

1,492,894

UNITED STATES PATENT OFFICE.

GRACE PEREGO, OF SAN FRANCISCO, CALIFORNIA.

VEHICLE TOP DUSTER.

Application filed July 11, 1922. Serial No. 574,248.

*To all whom it may concern:*

Be it known that I, GRACE PEREGO, a citizen of the United States, residing at San Francisco, in the county of San Francisco, State of California, have invented a new and useful Vehicle Top Duster, of which the following is a specification in such full and clear terms as will enable those skilled in the art to construct and use the same.

This invention relates to an automobile top duster and its object is to provide means whereby the top of automobiles or other vehicles may be kept clean substantially without attention upon the part of the driver, the duster being so arranged that each time the driver drives out of the garage, or back into the garage, that the dust adhering to the top will be brushed off, the duster being arranged over the top of the car and being of a length somewhat greater than the total width of the top.

Other objects of the invention will appear as the description proceeds.

An embodiment of the invention is shown in the accompanying drawings in which the same reference numeral is applied to the same portion throughout, but I am aware that there may be modifications thereof.

Figure 1:
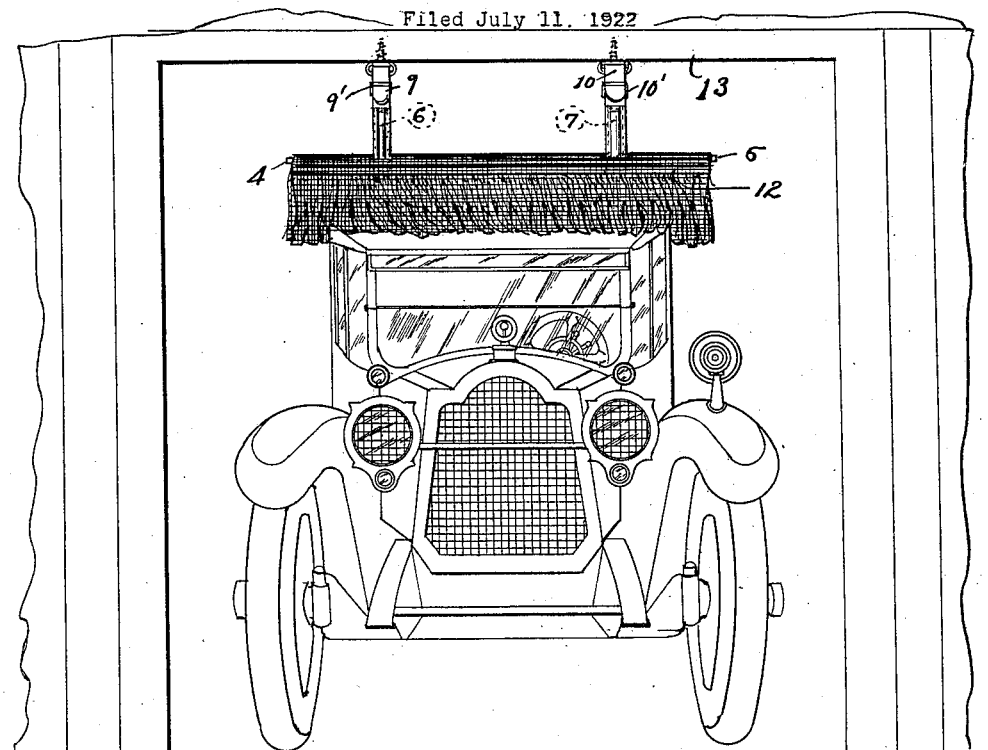
Figure 1 is a front elevation of a portion of a garage and a car showing the application of a duster in use.
Figure 2:
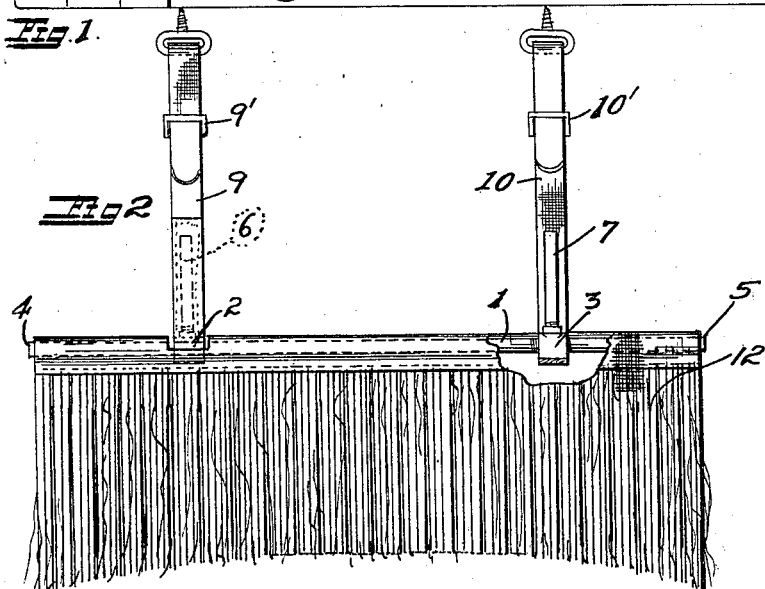
Figure 2 is a front elevation of the duster as it appears detached from the garage.
Figure 3:
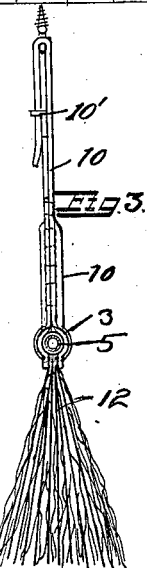
Figure 3 is a side elevation of the duster.

The duster consists of any suitable rod 1, in the present instance ordinary pipe is used and two T's 2 and 3 are secured on the pipe, said T's having short horizontally extending lengths 4 and 5 connected therewith, and short upwardly extending lengths of pipe 6 and 7 connected therewith.

Suitable double straps of fabric or leather 9 and 10 are used to support the duster, and buckles 9', 10' are provided to adjust the height of the duster. The straps are bound completely around the upwardly extending lengths of pipes 6 and 7 to prevent them from marring the finish of the car. The horizontal rod is covered with several thicknesses of blanket or other fabric 12, which is slitted to form a suitable wiper which engages the vehicle top each time the vehicle is moved into or out of the garage.

The object of having the upwardly extending rods 6 and 7 connected to the horizontally extending member is to hold the horizontal member with its wiping fabric in the proper position to clean the car top, since if these rods are not used the wiper will drag over the top and will turn horizontally instead of acting as broom.

In use the straps 9 and 10 are suspended from any suitable portion of the garage, as for example, a bar 13, at a convenient height to brush the top of the car, therefore each time the car is brought into the garage or taken out, it is swept clean of dust. Screw eyes 14, 15 are ordinarily used to support the duster to permit it to be easily adjusted to the desired height.

What I claim is as follows, but various modifications may be made in the construction shown in the drawings and above particularly described form, within the purview of my invention.

1. A duster for vehicle tops, comprising a bar, straps for suspending said bar horizontally from the ceiling of a garage in the path of an automobile, and a duster fabric carried by the bar and depending therefrom, adapted to wipe the top of an automobile as the latter passes into and out of the garage.

2. A duster for vehicle tops comprising a bar, straps connected to said bar and adapted to suspend the same substantially horizontally from the ceiling of a garage in the path of an automobile, a duster fabric carried by the bar and depending therefrom and rods connected to said bar and extending parallel to the straps to prevent the bar from turning axially and being accidentally caught on projections of the vehicle top.

3. A duster for vehicle tops comprising a bar, a pair of adjustable straps for supporting said bar from the ceiling of a garage in the path of an automobile, rods connected to the bar and enclosed by said straps to prevent the bar from turning axially and being caught on a vehicle top, and a duster fabric supported by the bar and depending therefrom, adapted to wipe the top of an automobile as the latter passes into and out of the garage.

In testimony whereof I have hereunto set my hand this 29th day of June, A. D., 1922.

GRACE PEREGO.